(12) United States Patent
Smyrniotis et al.

(10) Patent No.: US 9,393,518 B2
(45) Date of Patent: *Jul. 19, 2016

(54) PROCESSES, APPARATUS, COMPOSITIONS AND SYSTEMS FOR REDUCING EMISSIONS OF HCl AND/OR SULFUR OXIDES

(71) Applicant: FUEL TECH, INC., Warrenville, IL (US)

(72) Inventors: Christopher R. Smyrniotis, St. Charles, IL (US); Kent W. Schulz, Geneva, IL (US); Emelito P. Rivera, Inverness, IL (US); Ian Saratovsky, Highland Park, IL (US); Vasudeo S. Gavaskar, Naperville, IL (US)

(73) Assignee: FUEL TECH, INC., Warrenville, IL (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/190,451

(22) Filed: Feb. 26, 2014

(65) Prior Publication Data

US 2014/0314650 A1  Oct. 23, 2014

Related U.S. Application Data

(60) Provisional application No. 61/769,819, filed on Feb. 27, 2013.

(51) Int. Cl.
*B01D 53/40* (2006.01)
*B01D 53/50* (2006.01)
*B01D 53/68* (2006.01)

(52) U.S. Cl.
CPC .............. *B01D 53/68* (2013.01); *B01D 53/507* (2013.01); *B01D 2251/60* (2013.01); *B01D 2251/80* (2013.01); *B01D 2257/2045* (2013.01); *B01D 2258/0283* (2013.01)

(58) Field of Classification Search
CPC ...... B01D 53/50; B01D 53/508; B01D 53/68; B01D 53/685
See application file for complete search history.

(56) References Cited

U.S. PATENT DOCUMENTS 2,965,438 A 12/1960 Mullen, Jr.
3,226,192 A 12/1965 Atsukawa et al.
(Continued)

FOREIGN PATENT DOCUMENTS

WO 9219365 A1 11/1992
WO 0216026 A2 2/2002
WO 2011143517 A1 11/2011

OTHER PUBLICATIONS

EPA-452/R-97-010; Dec. 1997; Mercury Study, Report 5 to Congress; Volumne VII: An Evaluation of Mercury Control Technologies and Costs.
(Continued)

*Primary Examiner* — Timothy Vanoy
(74) *Attorney, Agent, or Firm* — Thaddius J. Carvis

(57) ABSTRACT

HCl and sulfur oxides are reduced by treating combustion gases with an aqueous copper compound referred to as copper-based chloride remediator (CBCR). The process is preferably implemented by identifying locations within a combustor for feeding the CBCR, determining the physical form and injection parameters for the CBCR and injecting the CBCR under conditions effective to reduce HCl and/or sulfur oxides. Effective temperatures for introducing the CBCRs can be from about 250° to 900° F. for HCl and up to about 2200° F. for sulfur oxides. Preferred CBCRs include copper and an ammonia moiety. One composition is copper diammonium diacetate, empirical formula of $C_2H_7CuNO_2$. CBCR compositions are not sorbents and chemically convert HCl from a gaseous to a solid form.

8 Claims, 3 Drawing Sheets

(56) References Cited

U.S. PATENT DOCUMENTS

| | | | |
|---|---|---|---|
| 3,900,504 A | 8/1975 | Woerner | |
| 3,956,458 A | 5/1976 | Anderson | |
| 4,020,180 A | 4/1977 | Woerner | |
| 4,081,253 A | 3/1978 | Marion | |
| 4,500,327 A | 2/1985 | Nishino et al. | |
| 4,609,537 A | 9/1986 | Tolpin et al. | |
| 4,724,130 A | 2/1988 | Statnick et al. | |
| 4,731,233 A | 3/1988 | Thompson et al. | |
| 4,755,499 A | 7/1988 | Neal et al. | |
| 4,795,586 A | 1/1989 | Thompson | |
| 4,923,688 A | 5/1990 | Iannicelli | |
| 5,114,898 A | 5/1992 | Pinnavaia et al. | |
| 5,492,685 A | 2/1996 | Moran | |
| 5,520,898 A | 5/1996 | Pinnavaia et al. | |
| 5,658,547 A | 8/1997 | Michalak et al. | |
| 5,740,745 A | 4/1998 | Smyrniotis et al. | |
| 5,741,469 A * | 4/1998 | Bhore et al. | 423/244.01 |
| 5,894,806 A | 4/1999 | Smyrniotis et al. | |
| 5,897,688 A | 4/1999 | Voght et al. | |
| 6,281,164 B1 | 8/2001 | Demmel et al. | |
| 6,453,830 B1 | 9/2002 | Zauderer | |
| 6,579,507 B2 | 6/2003 | Pahlman et al. | |
| 6,610,264 B1 * | 8/2003 | Buchanan et al. | 423/242.1 |
| 6,808,692 B2 | 10/2004 | Oehr | |
| 6,878,358 B2 | 4/2005 | Vosteen et al. | |
| 6,953,494 B2 | 10/2005 | Nelson | |
| 6,974,564 B2 | 12/2005 | Biermann et al. | |
| 7,435,286 B2 | 10/2008 | Olson et al. | |
| 7,666,374 B2 | 2/2010 | Grochowski | |
| 8,916,120 B2 * | 12/2014 | Smyrniotis et al. | 423/240 R |
| 2006/0210463 A1 | 9/2006 | Comrie | |
| 2008/0127631 A1 | 6/2008 | Haitko et al. | |
| 2009/0056538 A1 | 3/2009 | Srinivasachar et al. | |
| 2010/0059428 A1 | 3/2010 | Boren | |
| 2010/0282140 A1 | 11/2010 | Matteson et al. | |
| 2010/0317509 A1 | 12/2010 | Wang | |
| 2011/0045422 A1 | 2/2011 | Tanca | |
| 2011/0079143 A1 | 4/2011 | Marotta et al. | |
| 2013/0204064 A1 * | 8/2013 | Kanazirev et al. | 585/823 |
| 2013/0204065 A1 * | 8/2013 | Kanazirev et al. | 585/824 |

OTHER PUBLICATIONS

Kettner, The Removal of Sulfur Dioxide from Flue Gases, Bulletin of the World Health Organization. 32: 421-429, 1965 {retrieved on Sep. 18, 2013}.Retrieved from the internet. <URL:http://whqlibdoc.who.int/bulletin/1965/Vol32/Vol32-No3/bulletin__1965__32% 283% 29__421-429.pdf>.

Srivastava, Ravi K., Controlling SO2 Emissions: A Review of Technologies: EPA/600/R-00/0093, Nov. 2000.

PCT Search Report, May 2014.

* cited by examiner

PROCESSES, APPARATUS, COMPOSITIONS AND SYSTEMS FOR REDUCING EMISSIONS OF HCl AND/OR SULFUR OXIDES

This application claims priority to U.S. Provisional Patent Application 61/769,819 filed Feb. 27, 2013, and the disclosure of that application is incorporated herein in its entirety.

FIELD OF THE INVENTION

The invention relates to reducing emissions of hydrogen chloride (HCl) and sulfur oxides ($SO_x$), $SO_2$ and HCl in particular, by employing a group of highly-effective chemicals, which were previously described by the inventors as sorbent doping agents to be used in combination with a sorbent. See, for example, the descriptions in U.S. Provisional Patent Applications 61/618,233 filed Mar. 30, 2012 and 61/641,055 filed May 1, 2012. The disclosures of these prior applications are incorporated herein by reference in their entireties.

It is a surprising discovery that a group of non-sorbent chemicals can be effective for HCl and $SO_2$ reduction even in the absence of a sorbent material. The discovery has significant implications in processes where HCl and $SO_2$ have been implicated with processing difficulties as well as being harmful emissions.

BACKGROUND OF THE INVENTION

The emissions of hydrochloric acid and sulfur oxides have challenged combustion plant operators and regulators since there became an awareness of the harmful effects of acid rain. These materials have recently taken on regulatory and technical momentum.

Being acid materials, the art has generally employed alkali- or alkaline earth-containing sorbents to control them. A variety of wet and dry scrubbing and sorbent injection techniques have been employed, but the scrubbing techniques typically require the installation of large and expensive capital equipment and add significant solids that need processing.

Many older plants are averse to the installation of large capital equipment owing to lack of space and uncertainty with respect to future retirement dates. Dry sorbent injection offers a lower-capital alternative to wet and dry scrubbers but adds solids that must be recovered and disposed.

Calcium-containing sorbents are often less efficient in capturing $SO_2$ and HCl than sodium-based sorbents, and calcium-based sorbents are highly resistive. As such, large quantities of sorbent often must be used to comply with HCl and $SO_2$ emissions limits, and the resistive nature of calcium-containing sorbents can negatively impact the operation of electrostatic precipitators used to remove particulate matter. Negatively impacting electrostatic precipitation can result in increased particulate emissions and violation of particulate emissions limits.

Injection of sodium-containing sorbents into ducts can be used to efficiently reduce HCl and $SO_2$ with minimal impact on electrostatic precipitation. However, sodium-containing sorbents are difficult to handle (e.g., hygroscopic), can ruin the ability of fly ash to be used in the manufacture of concrete, and increase the solubility of heavy metals in fly ash ponds, and ultimately results in the leachability of heavy metals (e.g. arsenic and selenium) into the environment.

Accordingly, there is a present need for a process that can reduce HCl and/or $SO_2$ emissions from combustion gas streams by employing a non-sorbent material. It would be especially helpful if such a composition was in the form of a molecular reactant (as opposed to a solid sorbent) which could chemically convert the chloride content of HCl to a stable chemical form that could be easily removed from the system by cloth filters, electrostatic precipitators or like solids recovery apparatus.

SUMMARY OF THE INVENTION

The present invention provides processes, apparatus, compositions and systems that will have a very positive effect on air quality by enabling reduction of HCl and/or $SO_x$ emissions at a with minimal increase in mass loading. The invention can be employed as a retrofit solution to existing combustors and can be used in design of new combustors. It will be understood that the term "composition" includes compounds and complexes and is not meant to differentiate between types of bonding, e.g., "strong bonds" such as covalent or ionic bonds and "weak bonds" such as dipole-dipole interactions, the London dispersion force and hydrogen bonding.

In one aspect, the invention provides a process comprising: introducing a copper bearing chloride remediator (CBCR) composition in aqueous form into contact with combustion gases within a defined introduction zone under conditions effective for HCl and/or $SO_x$ emissions control; and discharging the gases from the defined zone following sufficient reaction time to reduce the HCl and/or $SO_x$ concentration in the gases.

In one preferred aspect, the CBCR will comprise a copper composition selected from the group consisting of copper ammonium acetate, copper diammonium diacetate, copper ammonium triacetate, copper triammonium acetate, copper acetate monohydrate, copper acetylacetonate (and hydrates thereof), copper citrate (and hydrates thereof, e.g., hemipentahydrate), copper formate (and hydrates thereof), copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these. From another perspective, the CBCR can be a member selected from the group consisting of compositions defined by the formula $Cu(NH_3)_x(OCOCH_3)_y$, wherein x is an integer from 0 to 4, y is an integer from 0 to 2, and x+y is equal to or greater than 1.

In another aspect, the copper composition will be introduced to reduce HCl and the process will entail steps of monitoring the HCl concentration of the combustion gases prior to the defined zone and following the defined zone, wherein the temperature is less than 1000° F., preferably within the range of from about 250° to about 900° F.

In another aspect, the aqueous copper composition will be introduced to reduce $SO_2$ and will entail steps of monitoring the $SO_2$ concentration of the combustion gases prior to the defined zone and following the defined zone, wherein the temperature is less than 2200° F., preferably within the range of from about 250° to about 900° F.

Other preferred aspects, including preferred conditions and equipment and their advantages, are set out in the description which follows.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

Figure 1:
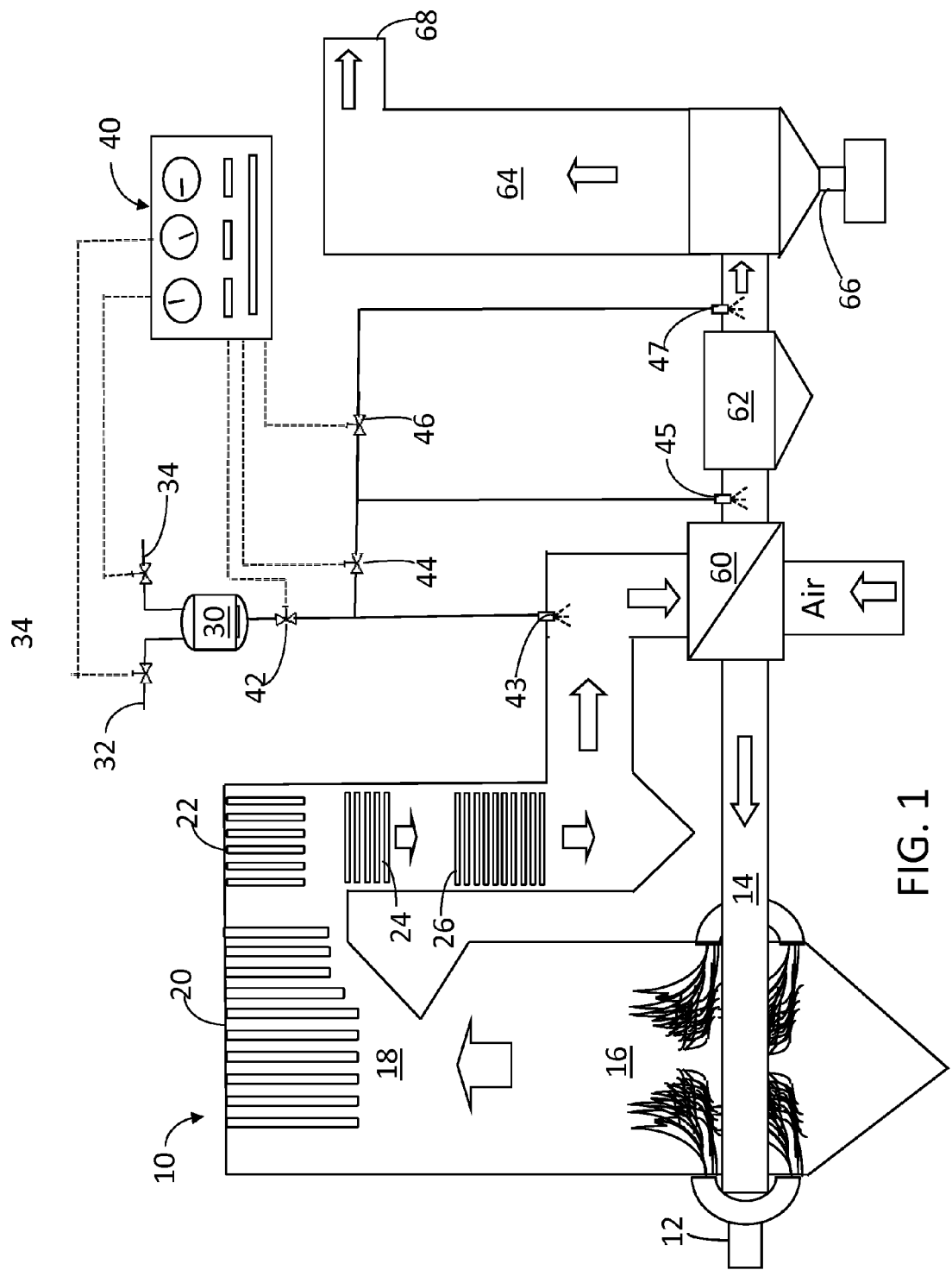
FIG. 1 is a flow diagram of one embodiment of the invention.

Reference will first be made to FIG. 1, which is a flow diagram of one embodiment of the invention. A combustor 10 can be of the type used for producing steam for electrical power generation, process steam, heating or incineration. It will be understood that other types of combustors can be employed to utilize the advantages of the invention. Unless otherwise indicated, all parts and percentages in this description are based on the weight of the materials at the particular point in processing or dry where that is indicated.

A suitable fuel, such as coal, is fed to the combustor 10 via line 12 and burned with air from line 14 in a combustion zone 16. It is an advantage of the invention that coal that is high in chloride or sulfur can be combusted with the resulting pollutants HCl and $SO_x$ emissions reduced. It will be understood that the principals of the invention can be applied to other carbonaceous fuels and fuel mixtures (any other fuel of choice, typically a carbonaceous thermal fuel or refuse).

Air for combustion, supplied by line 14, is preferably pre-heated by gas-to-gas heat exchanger 60 which transfers heat from ductwork at the exit end of the combustion equipment, e.g., downstream of heat exchange sections 20-26, where useful thermal energy is recovered from the combustor. Hot combustion gases flow through the upper portion of combustor 18 as indicated by the block arrows, then flow past heat exchangers shown in various sections, from 20 to 26, which transfer heat from the combustion gases to water or steam for the generation of steam or super-heated steam. A typical heat exchanger will include a plurality of heat exchanger sections, such as a superheater 20, a reheater 22 and an upper economizer 24 and a lower economizer 26. Other configurations may also be employed as dictated by the design of a particular boiler.

Based on several test programs, it has been discovered and substantiated that a group of highly-active copper compositions are effective for remediating HCl and/or $SO_x$ emissions and can be employed as water-borne chemicals for introduction into a flue gas to be treated. The group of copper compositions effective for HCl and/or $SO_x$ emissions control according to the invention are referred to herein as copper-based chloride remediators (CBCRs). As used in this description, the term "composition" includes compounds and complexes and is not meant to differentiate between types of bonding, e.g., "strong bonds" such as covalent or ionic bonds and "weak bonds" such as dipole-dipole interactions, the London dispersion force and hydrogen bonding. It is believed that some of the CBCRs are chemical complexes. Compositions described in U.S. Pat. Nos. 3,900,504 and 4,020,180 to Woerner are included as CBCR compositions, and the disclosures of these patents are specifically incorporated herein by reference in their entireties. Specifically referenced compositions are those described in U.S. Pat. No. 4,020,180 as comprising an aqueous cuprammonium lower carboxylate complex of copper lower carboxylate and ammonium lower carboxylate in weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

Significantly, these compositions are not sorbents that collect pollutants and survive passage though the combustor for collection downstream. The CBCRs identified by the invention do not survive but are chemically altered to a form that reacts with the target pollutants.

The compositions of interest according to the invention are highly soluble or dispersible in water and react with the hot combustion gases to result in compositions chemically different from when contacted with the combustion gases. The compositions of interest include copper compositions that have copper in a form that can be released at the temperatures involved to form a reactive copper entity. While it is theorized that the copper is oxidized to copper oxide, CuO, applicants do not want to be bound by a particular theoretical reaction. It is believed that the reactive form of copper released can react with the HCl in the combustion gases to form a solid, e.g., $CuCl_2$, that can be eliminated by conventional particulate separation equipment such as an electrostatic precipitator (ESP) 62 or a baghouse 64, alone or in suitable combination that may include one or more other particulate recovery devices.

Among the CBCRs of interest to the invention are compositions that comprise copper and an ammonia moiety. Among these are ammonium copper compositions, including those having one or more copper atoms with one or more ammonium moieties. Water solubility or dispersibility is important because introducing them with water has been shown to be a highly-effective manner of achieving the necessary distribution followed by dissociation. Chemical dispersants and agitation can be employed as necessary.

In some embodiments of the invention, the CBCR will comprise a copper composition selected from the group consisting of copper ammonium acetate, copper diammonium diacetate, copper ammonium triacetate, copper triammonium acetate, copper acetate monohydrate, copper acetylacetonate (and hydrates thereof), copper citrate (and hydrates thereof, e.g., hemipentahydrate), copper formate (and hydrates thereof), copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these. From another perspective, the CBCR can be a member selected from the group consisting of compositions defined by the formula $Cu(NH_3)_x(lower\ carboxylate)_y$, wherein the lower carboxylate is selected from the group consisting of formate, acetate and propionate, x is an integer from 0 to 4, y is an integer from 0 to 2, and x+y is equal to or greater than 1.

Closely related compositions and their hydrates as well other copper sources that exhibit similar efficacies in reacting with HCl can be employed. Copper compositions that contain no ammonium moiety, can be employed, but it is believed that these compositions will be facilitated in effectiveness by the presence of ammonia, such as a result of processing (e.g., for $NO_x$ reduction) or by supplementation as needed with ammonia or urea or other material effective to produce ammonia at the temperatures involved, as well as compounds equivalent in effect, e.g., ammines and their salts, urea breakdown products, ammonium salts of organic and inorganic acids, ammonium carbamate, biuret, ammelide, ammeline, ammonium cyanate, ammonium carbonate, ammonium bicarbonate; ammonium carbamate; triuret, cyanuric acid; isocyanic acid; urea formaldehyde; melamine; tricyanourea and mixtures and equivalents of any number of these.

Among the CBCRs not containing an ammonium moiety are copper acetylacetonate (and hydrates thereof), copper citrate (and hydrates thereof, e.g., hemipentahydrate), copper formate (and hydrates thereof), copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these.

Reference is again made to FIG. 1, which depicts a mixing stage 30 provided to prepare an aqueous treatment agent containing water supplied via line 32 and one or more CBCRs supplied via line 34. The vessel can be agitated as necessary. The relative amounts of the materials and water can be controlled by a suitable controller 40, or batching and feed of the CBCRs can be achieved manually. Dotted lines in the drawings schematically designate control lines for proper communication between the various controlled lines and valves and the controller 40.

The aqueous CBCR will typically be supplied in aqueous form, e.g., containing from 80 to 99.8% water, with a narrower range being from about 85 to about 95%. These and other percentages given in this application are based on weight.

Preferred conditions will call for introducing the CBCRs using modeling techniques, such as computational fluid dynamics, which can be employed to initially determine the optimum locations (zones) to direct treatment chemicals within the boiler and/or ducts. Desirably, best CBCR introduction will achieve essentially full coverage of the CBCRs across a three-dimensional section of a passage for the gases to be treated. Preferably, a number of nozzles will be spaced within the zones to achieve at least 90% coverage at the temperature necessary for reaction. This section can have a depth in the direction of flow as necessary to assure complete coverage from the sorbent injectors used. In other words, the zone will preferably be of a depth in the direction of flow sufficient that each of the conical or like spray patterns from nozzles used to introduce the CBCR will overlap with at least one other spray pattern, thereby providing CBCR across the entire cross section of the zone. This three-dimensional section for treatment can be referred to as a defined introduction zone, and the aqueous CDCR will be introduced into this zone under conditions effective for HCl and/or $SO_x$ emissions control. Following this zone (i.e., downstream of it) the combustion gases now having been treated with the CBCR are discharged following sufficient reaction time to reduce the HCl and/or $SO_x$ concentration in the gases.

Depending on whether it is HCl or $SO_2$ being treated, or both, monitors for the designated pollutant will be positioned before and after the introduction zone to determine the effectiveness of the treatment. Monitors following the zone are positioned far enough downstream of the zone to assure time for essentially complete reaction between the pollutant and the CBCR. Residence times of at least one second and preferably from 2 to 5 seconds will usually be effective.

Desirably, the invention will achieve full effect by modeling, e.g., by mechanical modeling or computational fluid dynamics using computer and data input means to identify locations within a combustor for feeding aqueous CBCR and determine the physical form and injection parameters such as pressure, droplet size, droplet momentum and spray pattern for injection means positioned at locations, e.g., via injector locations 43, 45 and 47, which can be operated with the aid of valves 42, 44 and 46 via controller 40.

Each of the injector locations will typically employ a plurality of nozzles strategically positioned across the cross section at the designated locations to achieve essentially full cross sectional coverage. Note that FIG. 1 shows addition of aqueous CBCR into a suitable portion of the ductwork, e.g., before or after air preheater 60, before or after ESP 62 or just before a baghouse 64, where the temperature will be suitable, e.g., less than about 1000° F., say within the range of from about 900° to about 250° F. where the objective is to reduce HCl, while temperatures as high as 2200° F., but more typically from about 900° to about 250° F. can be employed where the objective is to reduce sulfur oxides.

The treatment rates of the aqueous CBCR will provide an effective amount of aqueous CBCR to assure that the HCl content is maintained below about 0.002 pounds per MMBtu (approximately 2.0 $ppm_v$). Feed rates will generally be less than 10 pounds per ton of fuel, e.g., from about 1 to 8 pounds per ton, and often from greater than about 1 to about 6 pounds per ton of fuel.

The invention will employ suitable injection means, such as nozzles of the internal mix or external mix type, which can be (but don't have to be) air atomized and are capable of feeding a hydrated dolomite sorbent and a sorbent doping agent at a predetermined rate relative to a measured concentration of $SO_x$ in said passage. The injection means should be further capable of introducing the aqueous CBCR in a predetermined physical form and with predetermined injection parameters for the aqueous CBCR including droplet size, momentum and concentration. Preferably, air assisted-atomizing nozzles are provided for introducing aqueous CBCR into combustion gases at an effective temperature.

The locations for the nozzles can be determined by computational fluid dynamics, by methodologies taught for example in U.S. Pat. No. 5,740,745 and U.S. Pat. No. 5,894,806, which are hereby incorporated by reference. The concentration of the CBCR and water in the treatment fluid, the nozzle pressure, droplet size, droplet momentum, spray pattern and flow rates can be initially determined by modeling to assure that the proper amount of CBCR is supplied to the correct location in the combustor or downstream equipment in the correct physical form to achieve the desired results of reduced HCl and/or $SO_2$.

The introduction of the aqueous CBCR into the combustion gases results in changes to the chemical makeup of the gases. In a normal pretreatment operation, the combustion gases just prior to the electrostatic precipitator (e.g., where the temperature is about 400° F.±100° F.) can be altered as to chemical makeup following introduction of the aqueous CBCR at 400° F., in accord with the following estimated comparative gaseous analysis:

| | $ppm_{vdc}$ (3% $O_2$) | |
|---|---|---|
| Component | Before | After |
| $SO_2$ | 200 | 160 |
| HCl | 21.7 | 1.73 |
| Particulate loading | 2.0 | 2.14 |

Two things are directly apparent: (1) the HCl is reduced by more than 80% and (2) the particulate loading has increased. We believe that the HCl has been largely converted from the gas phase to the solid phase believed to be copper chloride, which can simply be separated by particulate recovery equipment and at least some of which is insoluble in water. Some tests indicate that more than half of the copper chloride is insoluble.

It is, of course possible and is sometimes preferred to introduce other chemicals at the same or different locations as described in U.S. Provisional Patent Applications 61/618,233 filed Mar. 30, 2012 and 61/641,055 filed May 1, 2012.

It is an advantage of the invention that after contact times of less than about 3 seconds, e.g., under a second, the added reaction time provided by a fabric filter is not essential as it is to lesser active sorbent treatments of the prior art. Solids can be recovered via line 66, and flue gas can be exhausted via line 68.

It is another advantage of the invention that the CBCR treatment compositions of the present invention do not alter the effectiveness of brominated powdered activated carbon used for mercury remediation. This is believed to be made possible by the breakdown of the CBCR compositions during treatment in such a way that the HCl is taken out of the combustion gases and converted to a solid, such as copper chloride (or other chloride-containing copper compound), which can be removed with the particulates.

A yet further advantage of the invention is that the ability of the invention to remove chloride can be used to great advantage in the operation of processes which employ wet scrubbers based on calcium carbonate by eliminating the presence of soluble chloride in the scrubbers. By converting gaseous HCl in the combustion gases to a solid copper chloride and removing it before the chloride reaches the scrubber, the reactivity of the scrubbing slurry will be maintained by maintaining a low concentration of soluble chlorides as noted, for example, in U.S. Pat. No. 5,635,149 to Klingspor, et al.

In embodiments of the invention, it is also found that slagging can be reduced, even with coals that tend to promote slagging.

It is also an advantage of the invention that the concentration of $SO_3$ passed downstream to cold end equipment can be significantly reduced.

The following examples are presented to further explain and illustrate the invention and are not to be taken as limiting in any regard. Unless otherwise indicated, all parts and percentages are by weight.

Example 1

Figure 2:
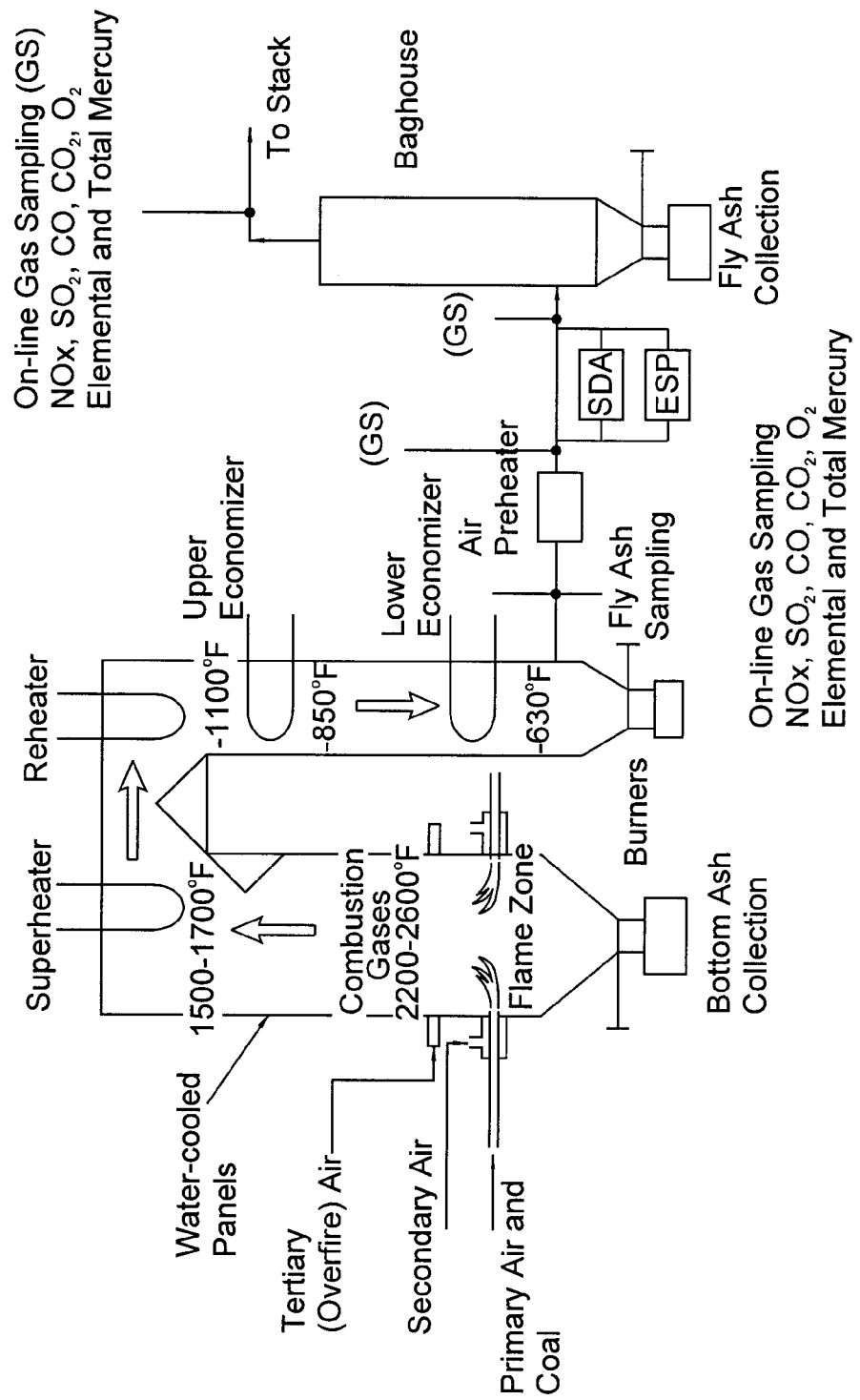
FIG. 2 is a flow schematic representation of a test apparatus employed in investigating the noted chemicals and application parameters for them.

This example describes the introduction of aqueous CBCR into a test apparatus as illustrated in FIG. 2 to determine the effectiveness and dosing response for removing HCl and sulfur dioxide. The furnace was approximately 18 inches across, associated ducts being about 3" (O.D.). Injectors were custom-designed to feed aqueous CBCR at 0.004 gpm (60 psig air), $d_{50}$ is about 16 μm, $d_{90}$ is about 30 μm and at 0.016 gpm (60 psig air), $d_{50}$ is about 19 μm, $d_{90}$ is about 33 μm chemical was fed from totes using pumps having a capacity of 12 GPD=32 mL/min. Powder River Basin subbituminous coal was burned and had a gross calorific value of about 9,800 Btu/lb and a low sulfur content measured as about 0.20-0.24% (w/w), such that uncontrolled $SO_2$ emissions about 150 $ppm_{vd}$ at 3% $O_2$. The coal had a low chloride content, which required spiking HCl into flue gas to achieve [HCl] of about 20 $ppm_{vdc}$ (at 3% $O_2$), significantly greater than the effluent without spiking.

Figure 3:
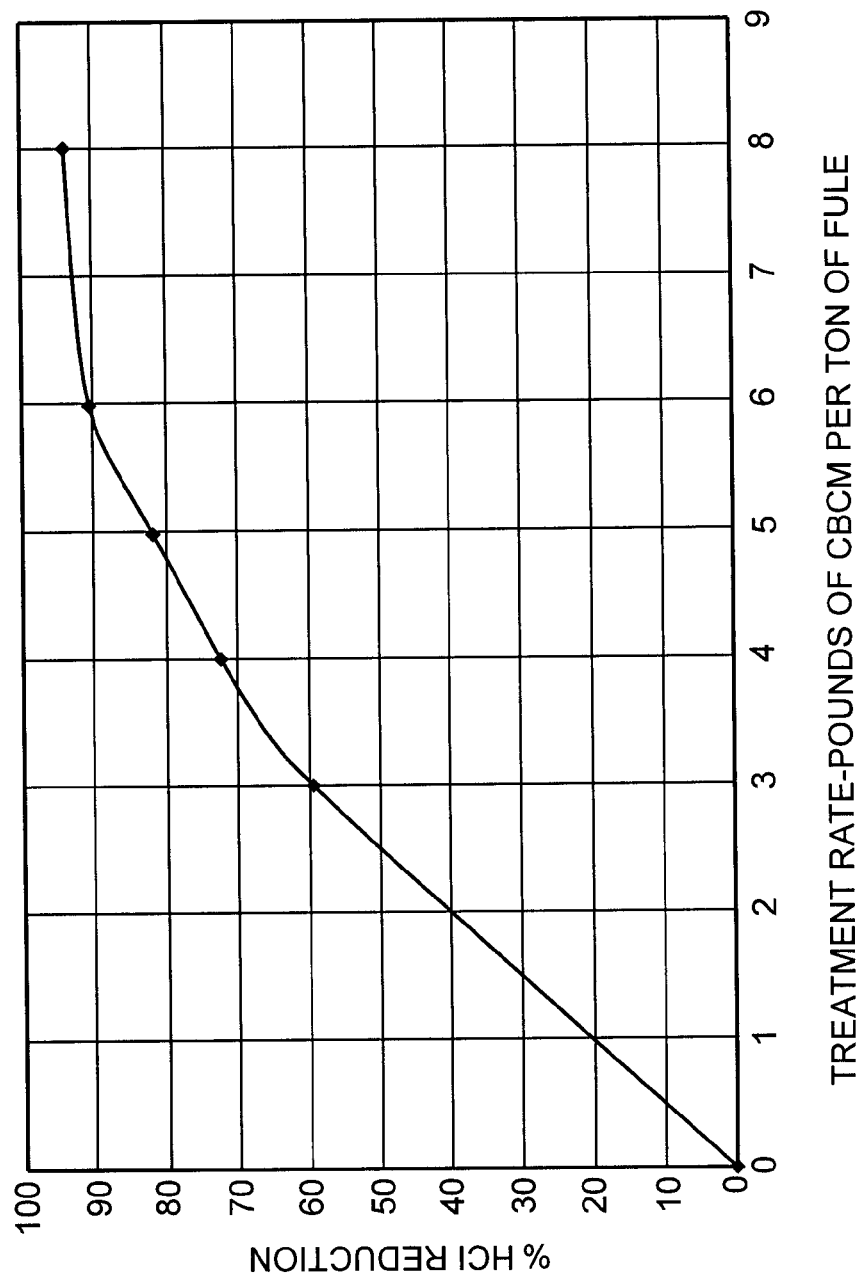
FIG. 3 is a graph showing data derived from testing as outlined in the examples.

FIG. 3 is a graph showing data derived from testing as outlined above.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for reducing emissions of HCl and/or $SO_x$ from a combustor, comprising: identifying locations within a combustor for feeding an aqueous copper-based chloride remediator, determining the physical form and injection parameters for the aqueous copper-based chloride remediator; introducing the aqueous copper-based chloride remediator into contact with combustion gases from a combustor within a defined introduction zone under conditions effective for HCl and/or $SO_x$ emissions control; and discharging the gases from the defined zone following sufficient reaction time to reduce the HCl and/or $SO_x$ concentration in the gases.

2. A process according to claim 1, wherein the copper-based chloride remediator comprises a copper composition selected from the group consisting of the copper diammonium diacetate, copper ammonium triacetate, copper triammonium acetate, copper acetate monohydrate, copper acetylacetonate and hydrates thereof, copper citrate and hydrates thereof, copper formate and hydrates thereof, copper nitrate and hydrates thereof, copper 2,4-pentandionate and hydrates thereof, copper sulfate and hydrates thereof, copper gluconate and hydrates thereof, copper soaps of fatty acids, and mixtures of any of these.

3. A process according to claim 1, wherein the copper-based chloride remediator is introduced to reduce HCl and the process further includes the steps of: monitoring the HCl concentration of the combustion gases prior to the defined introduction zone; monitoring the HCl concentration following the defined introduction zone, wherein the temperature is less than 1000° F.; sending control signals representative of each monitored concentration; comparing the control signals to reference values; and, based on the comparison, adjusting the introduction of the copper-based chloride remediator.

4. A process according to claim 1, wherein the copper-based chloride remediator is introduced to reduce $SO_2$ and the process further includes the steps of: monitoring the $SO_2$ concentration of the combustion gases prior to the defined introduction zone; monitoring the $SO_2$ concentration following the defined introduction zone, wherein the temperature is less than 2200° F.; sending control signals representative of each monitored concentration; comparing the control signals to reference values; and, based on the comparison, adjusting the introduction of the copper-based chloride remediator.

5. A process according to claim 1, wherein the copper-based chloride remediator is introduced at a temperature within the range of from about 250° to about 900° F. to reduce HCl.

6. A process according to claim 1, wherein the copper-based chloride remediator is introduced with at a temperature within the range of from about 250° to about 2200° F. to reduce sulfur oxides.

7. A process according to claim 1, which further comprises: identifying locations within a combustor for feeding the copper-based chloride remediator; determining the physical form and injection parameters for the copper-based chloride remediator; injecting copper-based chloride remediator under conditions effective to provide complete coverage across a cross section of the introduction zone.

8. A process for reducing emissions of HCl and/or $SO_x$ from a combustor, comprising: introducing aqueous copper-based chloride remediator comprising a copper composition selected from the group consisting of the copper diammonium diacetate copper ammonium triacetate, copper triammonium acetate, copper acetate monohydrate, copper acetylacetonate and hydrates thereof, copper citrate and hydrates thereof, copper formate and hydrates thereof, copper nitrate and hydrates thereof, copper 2,4-pentandionate and hydrates thereof, copper sulfate and hydrates thereof, copper gluconate and hydrates thereof, copper soaps of fatty acids, and mixtures of any of these, into contact with combustion gases from a combustor within a defined introduction zone under conditions effective for HCl and/or $SO_x$ emissions control; and discharging the gases from the defined zone following sufficient reaction time to reduce the HCl and/or $SO_x$ concentration in the gases; monitoring the HCl concentration of the combustion gases prior to the defined introduction zone; monitoring the HCl concentration following the defined introduction zone, wherein the temperature is less than 1000° F.; sending control signals representative of each monitored concentration; comparing the control signals to reference values; and, based on the comparison, adjusting the introduction of the copper-based chloride remediator.

* * * * *